(12) United States Patent
Uebayashi

(10) Patent No.: US 7,953,516 B2
(45) Date of Patent: May 31, 2011

(54) ACTUATOR AND ROBOT

(75) Inventor: Yuichi Uebayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/349,113

(22) Filed: Jan. 6, 2009

(65) Prior Publication Data

US 2009/0177325 A1    Jul. 9, 2009

(30) Foreign Application Priority Data

Jan. 7, 2008  (JP) .................. 2008-000472

(51) Int. Cl.
*G05B 19/04* (2006.01)
(52) U.S. Cl. ........................................ 700/249
(58) Field of Classification Search .......... 700/245, 700/249, 260
See application file for complete search history.

(56) References Cited

U.S. PATENT DOCUMENTS

2008/0075561 A1* 3/2008 Takemura et al. ............ 414/2
2008/0140321 A1* 6/2008 Blanc et al. .................. 702/41

FOREIGN PATENT DOCUMENTS

JP    2005-349555    12/2005

\* cited by examiner

*Primary Examiner* — Kim T Nguyen
(74) *Attorney, Agent, or Firm* — Rankin, Hill & Clark LLP

(57) ABSTRACT

An actuator and a robot are capable of properly adjusting the compliance of the motions of links in response to external forces according to an environment or application. The actuator sets a drive command angular velocity on the basis of a desired motor angular velocity, which is the resultant angular velocity of a desired link angular velocity and a desired driven angular velocity. The component of the desired link angular velocity included in a resultant desired velocity imparts stiffness to the motion of a link, while the component of the desired driven angular velocity included in the resultant desired velocity imparts flexibility to the motion of the link. Thus, the balance between the stiffness and the flexibility of the motion of the link is adjusted by adjusting the resultant ratio between the desired link angular velocity and the desired driven angular velocity.

6 Claims, 9 Drawing Sheets

ACTUATOR AND ROBOT

BACKGROUND OF THE INVENTION

1. Field of the Invention

The present invention relates to an actuator equipped with a drive mechanism, a flexible element interposed between an output shaft of the drive mechanism and a load, and a controller which controls an output to be applied to the load from the drive mechanism through the intermediary of the flexible element by controlling the operation of the drive mechanism, and a robot.

2. Description of the Related Art

There are the following two techniques, as engineering practices, for imparting compliance or flexibility to an arm of a robot so as to protect the arm or a component thereof from damage if the arm is subjected to an external force.

According to a first technique, an external force applied to the arm is measured on the basis of an output signal from an external force sensor provided in the arm, and a measurement result is input to a compliance model to obtain an output. Based on a command obtained as the result of the output, the joint angle or the joint displacement of the arm is controlled.

According to a second technique, a system for transmitting a driving force from a motor to a link constituting the arm is equipped with a flexible element in order to have the flexible element make up for the compliance in a frequency range in which the motor is unresponsive. As the second technique, there has been proposed a technique in which the expansion/contraction of the flexible element follows a torque command value, so that the expansion/contraction of the flexible element is not influenced by the joint displacement or the velocity of the arm, thus achieving a torque actuator which faithfully follows the torque command value (refer to Japanese Patent Application Laid-Open No. 2005-349555).

However, according to the first technique, improving the compliance requires prompt responses of the arm to the command. This in turn requires high rigidity of the components of the arm of the link or the like and prompt responsiveness of the motor. In particular, there is a restriction that the rigidity of the arm cannot be reduced because of the need for securing prompt motions of the arm in response to commands, thus making it difficult to achieve a lighter-weight, compact arm and to eventually achieve a multifunctional arm.

Further, according to the second technique, in order to add a damping element to a control system, it is necessary to provide a velocity feedback loop outside an expansion/contraction control system feedback loop. Therefore, in a control block diagram, the expansion/contraction control system feedback loop is disposed as a minor loop of the velocity feedback loop, leading to large orders of an object to be controlled and the control system. This results in deteriorated allowances of phases and gains, making it difficult to fully exercise damping effect.

SUMMARY OF THE INVENTION

An object of the present invention therefore is to provide an actuator and a robot which are capable of properly adjusting the compliance of the motions of links in response to external forces according to an environment or application.

An actuator according to a first aspect of the invention is an actuator equipped with a drive mechanism, a flexible element interposed between the drive mechanism and a load, and a controller which controls a force to be applied to the load through the intermediary of the flexible element by controlling the motion of the drive mechanism. The controller includes a first processor and a second processor. The first processor sets a desired driven velocity of the drive mechanism on the basis of a desired force to be applied to the load, an actual velocity of the load, actual positions of the drive mechanism and the load, and a flexibility coefficient indicative of the characteristic of the flexible element. The second processor sets a drive command velocity on the basis of a resultant desired velocity, which is a resultant velocity of a desired load velocity, which is a desired velocity of the load, and the desired driven velocity set by the first processor, and the controller controls the drive velocity of the drive mechanism on the basis of the drive command velocity set by the second processor.

The actuator according to the first aspect of the invention sets the drive command velocity of the drive mechanism on the basis of a resultant desired velocity, which is the resultant velocity of a desired load velocity (the desired velocity of a load) and a desired driven velocity. Then, the drive velocity of the drive mechanism is controlled on the basis of the drive command velocity. A desired load velocity component included in a resultant desired velocity allows "stiffness" to be imparted to a motion of a load. The "stiffness" in a motion means a property which works to cause the velocity of a load to agree with a desired load velocity against an external force which acts on the load. The load is moved such that the stiffness in a motion causes a reaction force to be generated in response to the external force. Moreover, a desired driven velocity component included in a resultant desired velocity allows "flexibility" to be imparted to the motion of a load. The "flexibility" in a motion means a property which works to cause a load to move in response to an external force acting on the load according to the property or the properties (one or both of an elastic property and a damping property) of a flexible element. The flexibility in a motion causes the load to move in accordance with the external force. This is because the desired driven velocity is set on the basis of a desired force acting on a load, a flexibility coefficient indicative of the property of a flexibility element, the actual velocity of the load, and the actual positions of a drive mechanism and the load, respectively. Thus, the balance between the stiffness and the flexibility of a motion of a load is adjusted by adjusting the resultant ratio between a desired load velocity and a desired driven velocity. This makes it possible to achieve proper compliance of motions of a load according to an environment and an application in which the actuator is operated.

The position of the drive mechanism is indicated in terms of the translational amount or the rotational amount of a component of the drive mechanism or the combination thereof. The drive velocity of the drive mechanism is indicated in terms of the translational amount or the rotational angular velocity of a component of the drive mechanism or the combination thereof. Similarly, the position of a load is indicated in terms of the translational amount or the rotational amount of the load or the combination thereof. The velocity of the load is indicated in terms of the translational velocity or the rotational angular velocity of the load or the combination thereof.

According to an actuator of a second aspect of the invention, in the actuator according to the first aspect of the invention, the second processor sets the permissible range of the drive velocity of the drive mechanism on the basis of the permissible range of a force of the actuator determined beforehand by specifications, the actual positions of the drive mechanism and the load, respectively, the actual velocity of the load, and the flexibility coefficient. Then, the resultant desired velocity is directly set as the drive command velocity if the resultant desired velocity falls within the permissible range, whereas if the resultant desired velocity does not fall within the permissible range, then the resultant desired velocity is amended such that it falls within the permissible range, thereby setting the drive command velocity.

In the actuator according to the second aspect of the invention, the drive command velocity is set such that the drive velocity of the drive mechanism does not deviate from the permissible range. This protects the drive mechanism and the system (including a flexible element) for transmitting a force from the drive mechanism to a load from being subjected to an excessive burden.

According to an actuator of a third aspect of the invention, in the actuator of the first aspect of the invention, the first processor calculates a force produced by a virtual elastic element on the basis of the difference between the desired position of the load and the actual position of the load, adds the calculated force to the desired force to be applied to the load so as to amend the desired force, then sets the desired driven velocity by using the amended desired force.

The actuator according to the third aspect of the invention makes it possible to properly amend the desired force to be applied to a load by the drive mechanism through the intermediary of the flexible element on the basis of the difference between the actual position of the load and the desired position of the load variably set according primarily to changes of environment or application.

An actuator of a fourth aspect of the invention is equipped with a resultant ratio setter which recognizes an action scheme for the load and sets a resultant ratio between the desired load velocity and the desired driven velocity by the second processor on the basis of the result of the recognition in the actuator according to the first aspect of the invention.

The actuator according to the fourth aspect of the invention adjusts the resultant ratio between a desired load velocity and a desired driven velocity on the basis of the action scheme for a load so as to properly adjust the balance between the stiffness and the flexibility of the motion of the load, thereby causing the load to behave according to the action scheme.

A robot according to a fifth aspect of the invention is a robot equipped with an actuator and a link driven by the actuator, wherein the actuator includes a drive mechanism, a flexible element interposed between the drive mechanism and the link as a load, and a controller which controls a force to be applied to the load through the intermediary of the flexible element by controlling the motion of the drive mechanism. The controller includes a first processor and a second processor. The first processor sets a desired driven velocity of the drive mechanism on the basis of a desired force to be applied to the load, an actual velocity of the load, the actual positions of the drive mechanism and the load, respectively, and a flexibility coefficient indicative of a property of the flexible element. The second processor sets a drive command velocity on the basis of a resultant desired velocity, which is a resultant velocity of a desired load velocity, which is a desired velocity of the load, and a desired driven velocity set by the first processor, and the controller controls the drive velocity of the drive mechanism on the basis of the drive command velocity set by the second processor.

According to the robot according to the fifth aspect of the invention, the drive command velocity of the drive mechanism is set on the basis of a resultant desired velocity obtained as the resultant velocity of a desired load velocity and a desired driven velocity. Then, the drive velocity of the drive mechanism is controlled on the basis of the drive command velocity, thereby controlling the motion of a link. Furthermore, the resultant ratio between a desired load velocity and a desired driven velocity is adjusted so as to adjust the balance between the stiffness and the flexibility of the motion of the link as a load, thus making it possible to achieve proper compliance of the motion of the load according to an environment or application in which the actuator is used.

In the robot according to the fifth aspect of the invention, a robot according to a sixth aspect of the invention is equipped with a resultant ratio setter which recognizes an action scheme of the robot and sets a resultant ratio between the desired load velocity and the desired driven velocity by the second processor on the basis of the result of the recognition.

The robot according to the sixth aspect of the invention adjusts the resultant ratio between a desired load velocity and a desired driven velocity on the basis of the action scheme of the robot, thus making it possible to properly adjust the balance between the stiffness and the flexibility of a motion of the load when the robot behaves according to the action scheme.

DESCRIPTION OF THE PREFERRED EMBODIMENTS

Embodiments of an actuator and a robot in accordance with the present invention will be described with reference to the accompanying drawings. The constructions of a robot and an actuator as the embodiments of the present invention will be described.

Figure 1:
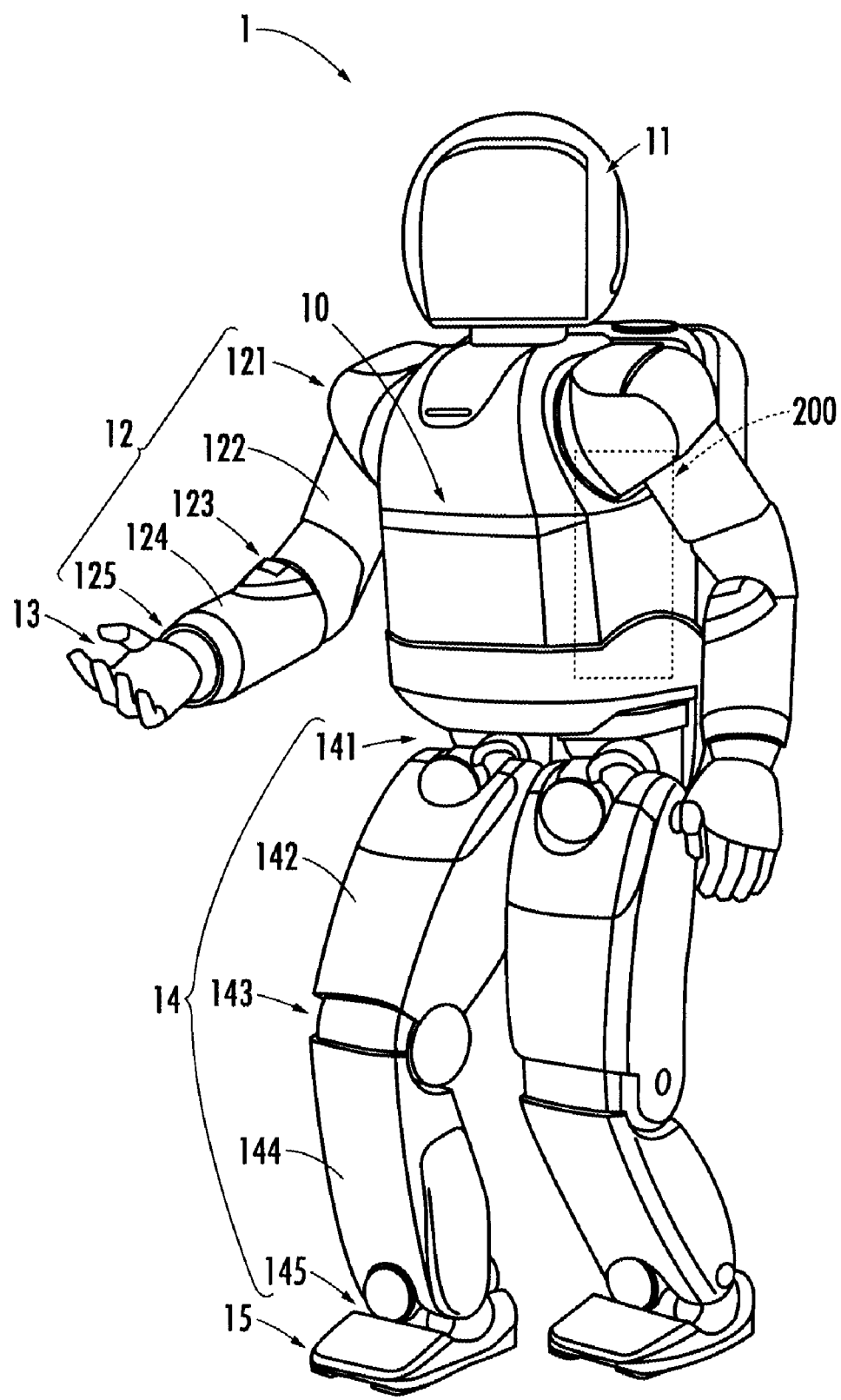
FIG. 1 is an explanatory diagram illustrating the construction of a robot as an embodiment of the present invention.

A robot 1 illustrated in FIG. 1 is a humanoid robot having a body 10, a head 11 disposed on the top of the body 10, right and left arms 12 provided at an upper portion of the body 10 such that they extend from both sides of the upper portion, hands 13 provided at the distal ends of the right and left arms 12, right and left legs 14 extendedly provided downward from the bottom of the body 10, and feet 15 provided at the distal ends of the right and left legs 14.

The body 10 is constructed of an upper section and a lower section vertically connected such that they may relatively rotate about a yaw axis. The head 11 is capable of making a motion, such as moving about the yaw axis, with respect to the body 10.

Each of the arms 12 has a first arm link 122 and a second arm link 124. The body 10 is connected with the first arm link 122 through the intermediary of a shoulder joint 121, the first arm link 122 and the second arm link 124 are connected through the intermediary of an elbow joint 123, and the second arm link 124 and the hand 13 are connected through the intermediary of a carpal joint 125. Each of the shoulder joints 121 has the freedom degree of rotation about a roll axis, a pitch axis, and the yaw axis, each of the elbow joints 123 has the freedom degree of rotation about the pitch axis, and the carpal joint 125 has the freedom degree of rotation about the roll axis, the pitch axis, and the yaw axis. Each of the hands 13 is equipped with five finger mechanisms which extend from the palm and which correspond to the thumb, the forefinger, the middle finger, the third finger, and the little finger of a human hand.

Each of the legs 14 has a first leg link 142 and a second leg link 144. The body 10 and the first leg link 142 are connected through the intermediary of a hip joint 141, the first leg link 142 and the second leg link 144 are connected through the intermediary of a knee joint 143, and the second leg link 144 and the foot 15 are connected through the intermediary of a foot joint 145. The hip joint 141 has the freedom degree of rotation about the roll axis, the pitch axis and the yaw axis, the knee joint 143 has the freedom degree of rotation about the pitch axis, and the foot joint 145 has the freedom degree of rotation about the roll axis and the pitch axis.

Figure 2:
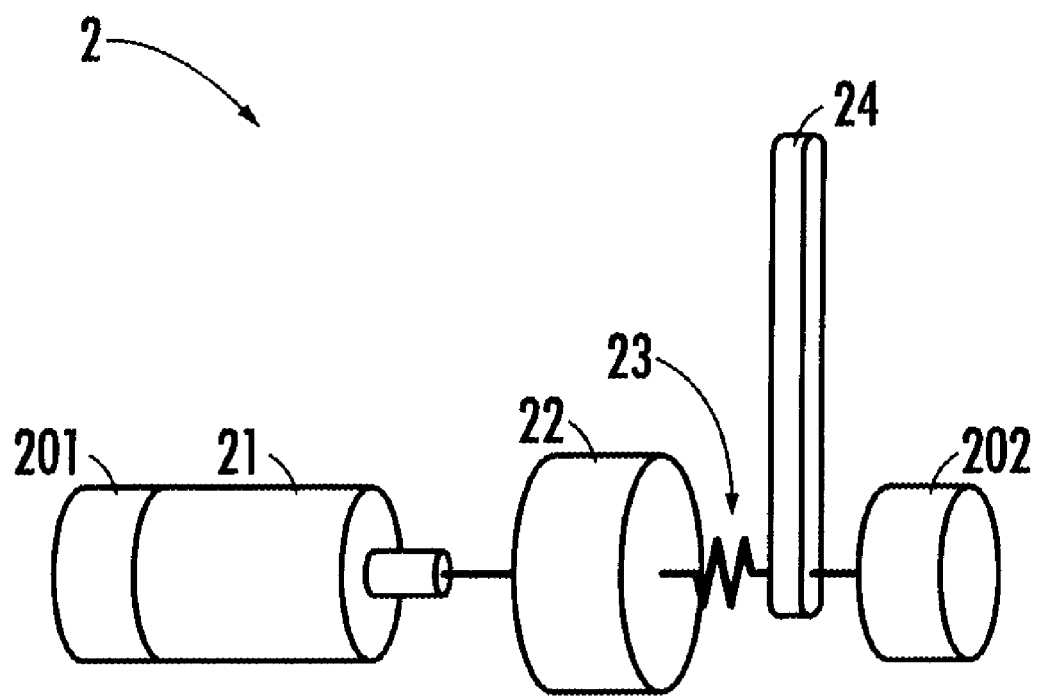
FIG. 2 is an explanatory diagram illustrating the construction of an actuator as an embodiment of the present invention.

The robot 1 has an actuator 2 illustrated in FIG. 2. The actuator 2 is equipped with a motor (drive mechanism) 21, the operation of which is controlled by a controller 200, a speed reducer 22, and a flexible element 23. An output shaft of the motor 21 is connected in series with the link (load) 24 (corresponding to one or all of the first arm link 122, the second arm link 124, the hand 13, the first leg link 142, the second leg link 144, and the foot 15) through the intermediary of the speed reducer 22 and the flexible element 23. The motor 21 runs from the electric power supplied from a battery (not illustrated) installed in the robot 1. The actuator 2 has a motor encoder 201 and a link encoder 202. The motor encoder 201 outputs a signal based on the angle of the output shaft of the motor 21 (a motor angle, which corresponds to the actual position of the drive mechanism) $\theta_M$. The link encoder 202 outputs a signal based on the angle of the link 24 (a link angle, which corresponds to the actual position of a load) $\theta_L$ and an angular velocity thereof (a link angular velocity, which corresponds to the actual velocity of a load) $\omega_L$.

The robot 1 is equipped with the controller 200 (shown in FIG. 3) which is constructed primarily of a CPU, a ROM, a RAM, an I/O, and an analog circuit and which controls the electric power supplied from the battery to the motor 21 thereby to control the motion of the robot 1. The controller 200 may be a decentralized control system constructed of a main control unit and a single or a plurality of sub-control units connected through an internal network of the robot 1. A motion control program for the computer installed in the robot 1 to function as the controller 200 may be stored beforehand in a memory, such as a ROM, or the program may be distributed (downloaded) or broadcast from the server to the computer through the intermediary of a network or an artificial satellite at an arbitrary timing, e.g., on a request from the robot 1, and then stored in a program memory.

The controller 200 is equipped with a first processor 210 and a second processor 220. The constituent elements of the controller 200 may share the same CPU, processor or analog circuit, or may use different CPUs and the like.

The first processor 210 sets a desired driven velocity $\omega_2$ of the motor 21 on the basis of a desired torque to be applied to the link 24 (a desired force to be applied to a load) $\tau_0$, a link angle (the actual position of the load) $\theta_L$, a link angular velocity (the actual velocity of the load) $\omega_L$, a motor angle (the actual position of the drive mechanism) $\theta_M$, and a flexibility coefficient indicative of the characteristics of the flexible element 23. The second processor 220 sets a drive command velocity $\omega_C$ on the basis of a resultant desired velocity $\omega_0$, which is a resultant velocity of a desired angular velocity (a desired load velocity) $\omega_1$ of the link 24 and a desired driven velocity $\omega_2$ set by the first processor 210. The controller 200 controls a motor velocity $\omega_M$, more accurately, a motor velocity trajectory $\omega_M(t)$ indicative of a time-series change thereof, on the basis of a drive command velocity trajectory $\omega_C(t)$ set by the second processor 220. The values of variables measured or set mean the trajectories indicative of the time-series changes thereof. For example, the link angle $\theta_L$ means a link angle trajectory $\theta_L(t)$ indicative of the time-series changes thereof.

Figure 4:
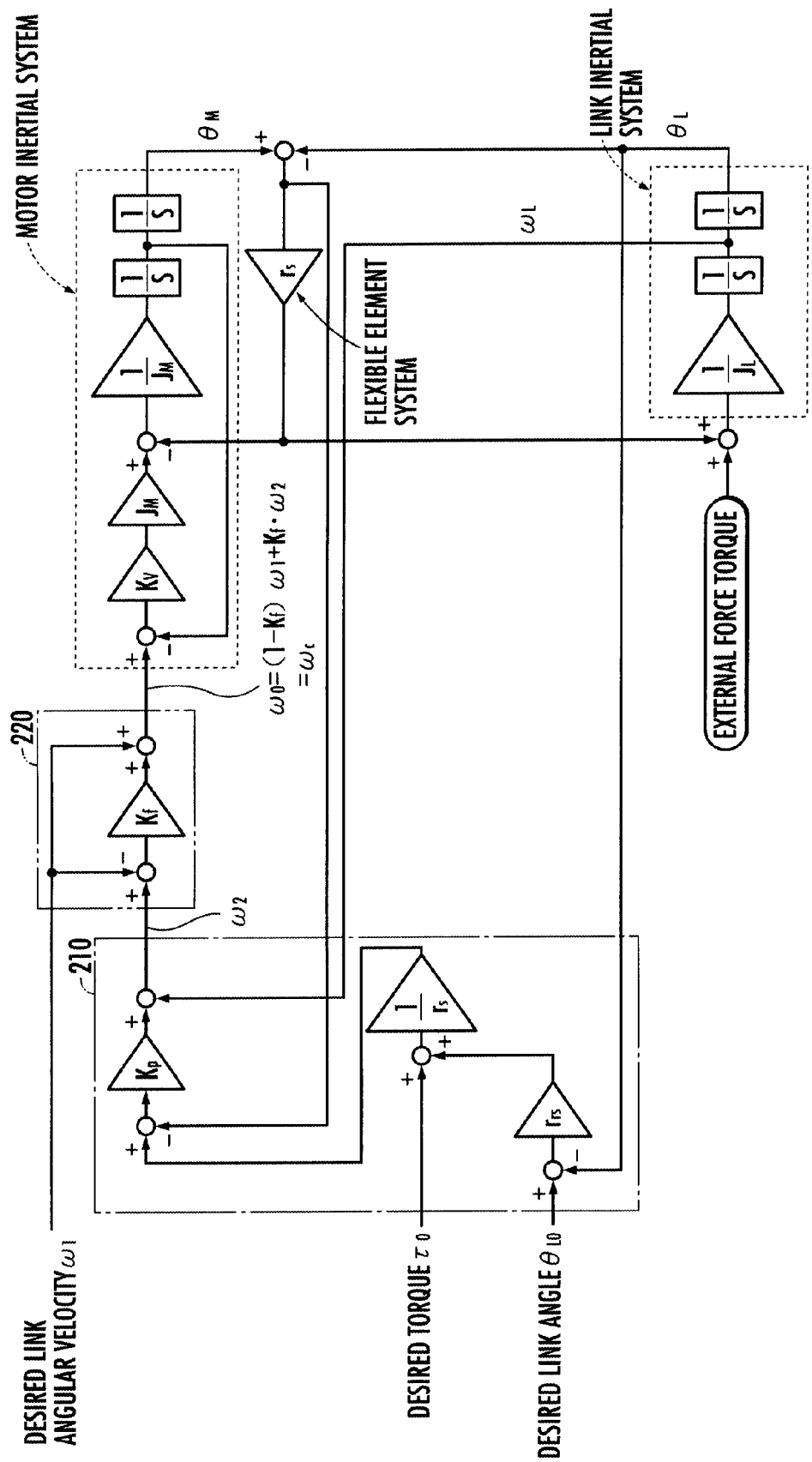
FIG. 4 is a control block diagram of the actuator in accordance with the present invention.
Figure 5:
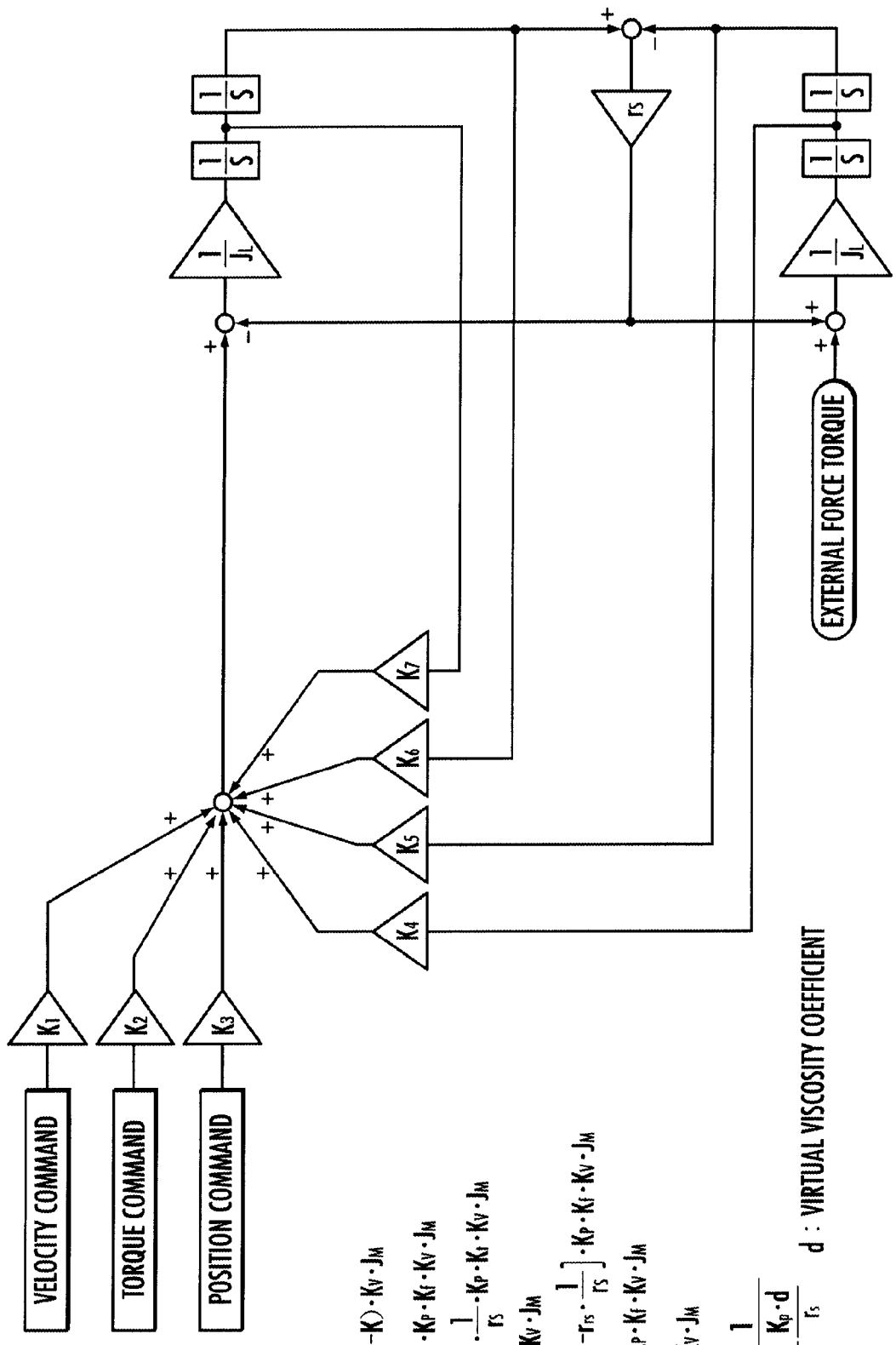
FIG. 5 is a modified control block diagram of the control block diagram of FIG. 4.

FIG. 4 is a control block diagram, including the controller 200 and the motor 21 to be controlled thereby. FIG. 5 is a modified block diagram of the control block diagram given in FIG. 4.

The functions of the robot 1 having the aforesaid construction will now be described. For the sake of simplicity of the following description, a case wherein the freedom degree of rotation at the joints 121 and the like is 1 and the variables are scalars will be described; alternatively, however, the freedom degree of rotation at the joints 121 and the like may be 2 or more and the variables may be extended to vectors or coefficient matrixes (or tensors).

Figure 6:
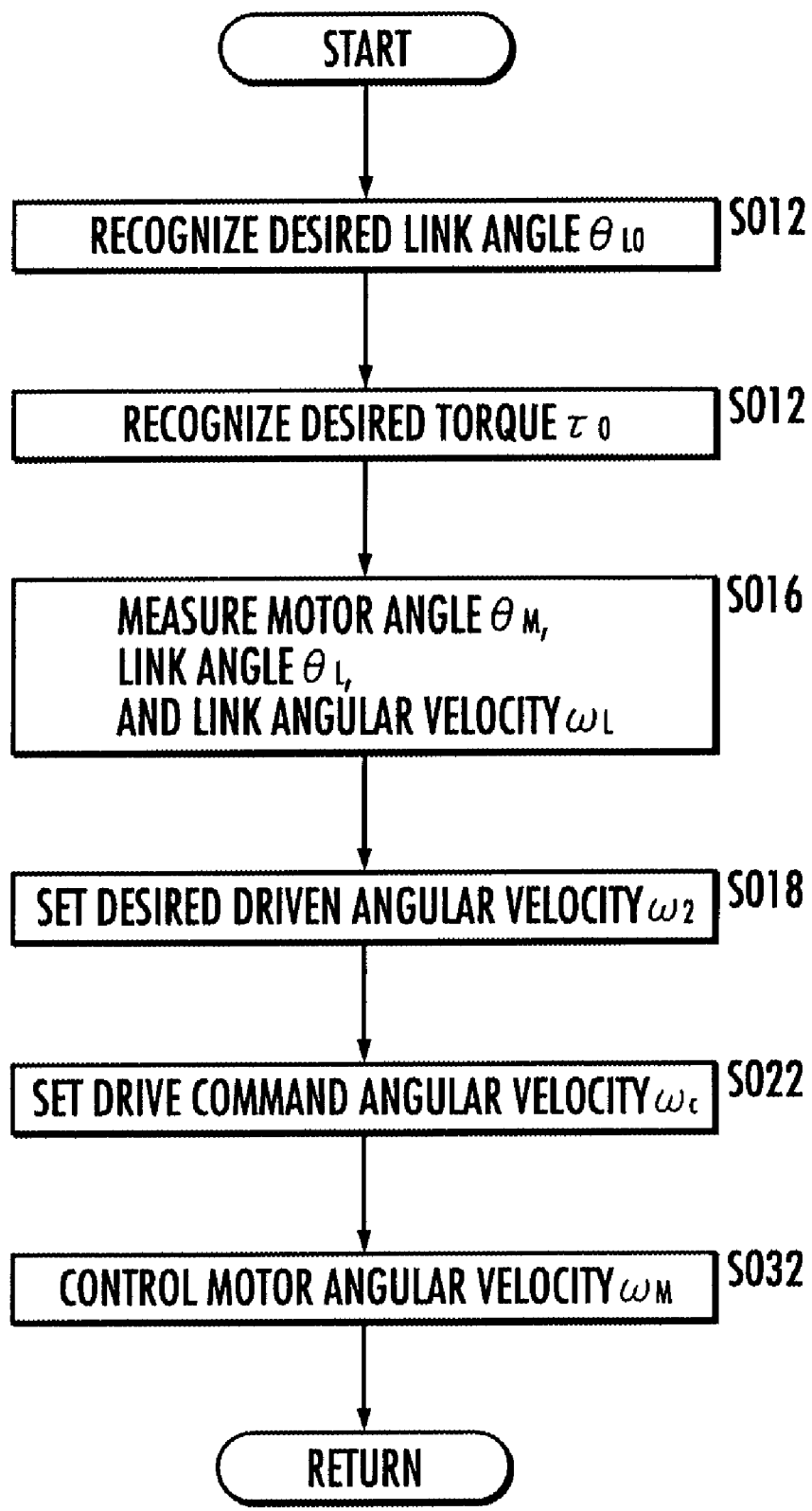
FIG. 6 is a control flowchart of the actuator in accordance with the present invention.

The first processor 210 reads a desired link angle $\theta_{L0}$ from a memory (S012 in FIG. 6). The desired link angle $\theta_{L0}$ may alternatively be retrieved from a database (not shown) by the controller 200 using the communication function of the robot 1 or received from a server (not shown) or generated by the controller 200 according to an inverse dynamics calculation model on the basis of an action scheme of the robot 1 stored in the memory. The first processor 210 sets a torque required for the link angle $\theta_L$ to agree with the desired link angle $\theta_{L0}$ as the desired torque $\tau_0$ be applied to the link 24 according to the inverse dynamics calculation model on the basis of the desired link angle $\theta_{L0}$ and the link angle $\theta_L$ (S014 in FIG. 6). Further, the first processor 210 measures the motor angle $\theta_M$ on the basis of an output signal of the motor encoder 201 and measures the link angle $\theta_L$ and the link angular velocity $\omega_L$ on the basis of an output signal of the link encoder 202 (S016 in FIG. 6). Then, the first processor 210 sets the desired driven angular velocity $\omega_2$, which is the desired angular velocity of the motor 21, according to expression (1) on the basis of the desired torque $\tau_0$, the above measurement results and flexibility coefficients $K_p$ and $r_s$ indicative of the property of the flexible element 23 (S018 in FIG. 6).

$$\omega_2 = K_p \cdot \{\tau_0/r_s - (\theta_M - \theta_L)\} + \omega_L \tag{1}$$

Expression (1) indicates that the sum of the force acting on the link 24 from the flexible element 23 on the basis of the difference between the motor angle $\theta_M$ and the link angle $\theta_L$ ($=r_s(\theta_M-\theta_L)$) ($r_s$: Elastic coefficient of the flexible element 23)) and the damping force acting on the link 24 from the flexible element 23 on the basis of the difference between the motor angular velocity $\omega_M$ and the link angular velocity $\omega_L$ ($=(r_s/K_p)\cdot(\omega_M-\omega_L)$ ($K_p$: Coefficient indicative of the damping property of the flexible element 23)) is equal to an actuator torque $\tau$ acting on the link 24.

The desired actuator torque $\tau_0$ is amended according to expression (2) on the basis of the difference between the desired link angle $\theta_{L0}$ and the link angle $\theta_L$ ($\theta_{L0}-\theta_L$)

$$\tau_0(\text{amended}) = \tau_0 - r_{vs}(\theta_{L0}-\theta_L) \tag{2}$$

Here, $r_{vs}$ denotes an elastic coefficient indicative of the property of a virtual flexible element, and the $r_{vs}$ is stored beforehand in a memory of the controller 200. The amendment of the desired actuator torque $T_0$ may be omitted.

Further, the second processor 220 sets a drive command angular velocity $\omega_C$ on the basis of the resultant desired angular velocity $\omega_0$ as the resultant angular velocity of the desired load angular velocity $\omega_1$ and the desired driven angular velocity $\omega_2$ set by the first processor 210 (S022 in FIG. 6). The resultant desired angular velocity $\omega_0$ is calculated according to expression (3) (refer to FIG. 4). In the present embodiment, the resultant desired angular velocity $\omega_0$ is directly set as the drive command angular velocity $\omega_C$.

$$\omega_0 = (1-K_f)\cdot\omega_1 + K_f\cdot\omega_2 \quad (3)$$

Here, $K_f$ denotes the resultant ratio of the desired load angular velocity $\omega_1$ and the desired driven angular velocity $\omega_2$ and the $K_f$ is stored in a memory beforehand. The resultant ratio $K_f$ is represented as the function of gain coefficients $K_4$ and $K_7$ in FIG. 5 according to expression (4).

$$K_f = -(K_4/K_7) \quad (4)$$

The resultant ratio $K_f$ is also represented, according to expression (5), as the function of a virtual viscosity coefficient d included in the aforesaid motion equation to represent the damping property of the flexible element 23.

$$K_f = (1 + K_p \cdot d/r_s)^{-1} \quad (5)$$

Then, the controller 200 controls the operation of the motor 21 by controlling the electric power supplied from the battery to the motor 21 such that the motor angular velocity $\omega_M$ agrees with the drive command angular velocity $\omega_C$ set by the second processor 220 (S032 in FIG. 6). More specifically, the motor torque $\tau_M$ is controlled according to expression (6) on the basis of the difference between the drive command angular velocity $\omega_C$ (=the resultant desired angular velocity $\omega_0$) and the motor angular velocity $\omega_M$ and the difference between the motor angle $\theta_M$ and the link angle $\theta_L$ (refer to FIG. 4).

$$\tau_M = \omega_C - \omega_M - r_s\cdot(\theta_M - \theta_L) \quad (6)$$

Figure 3:
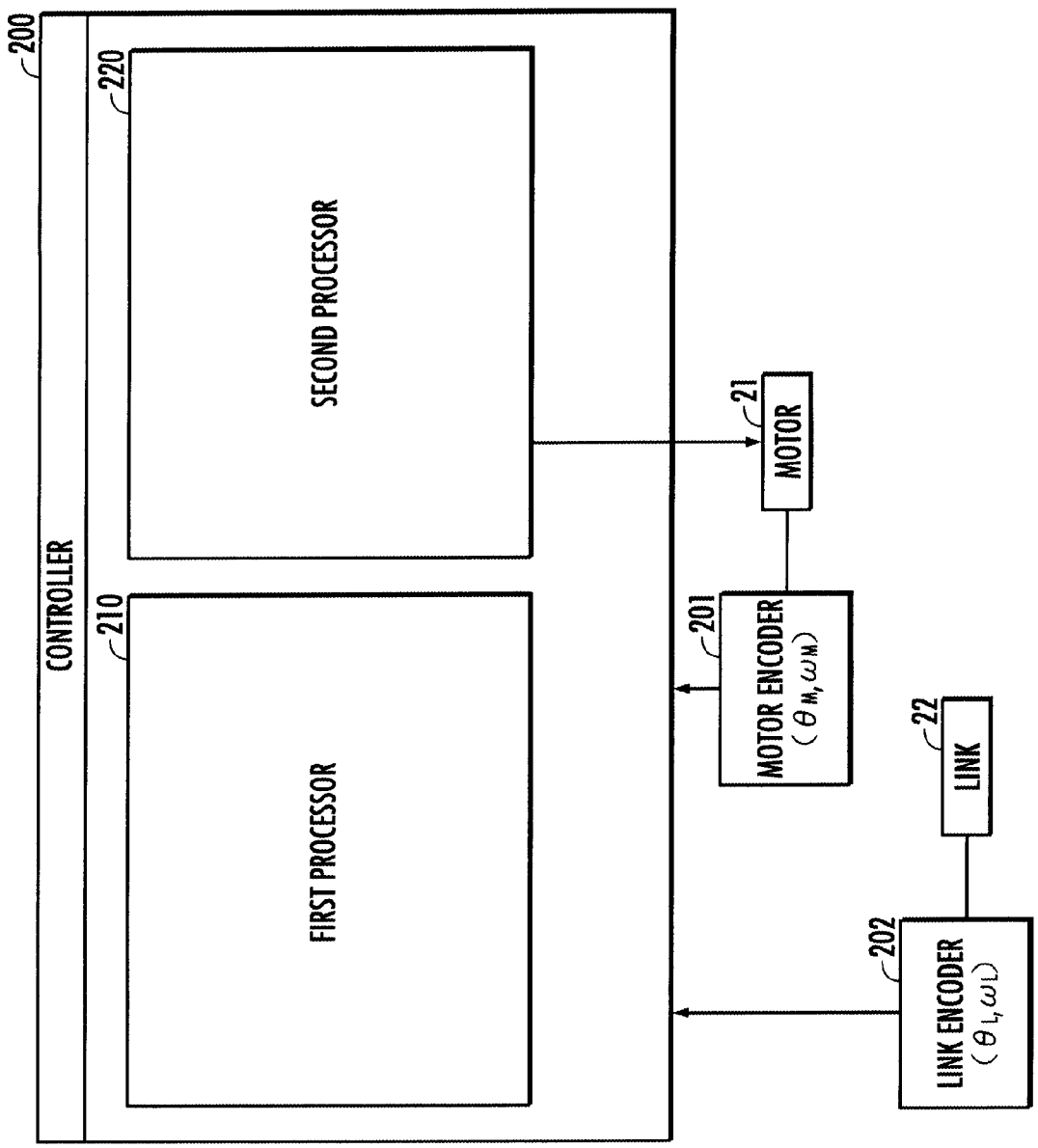
FIG. 3 is an explanatory diagram illustrating the construction of a controller of the actuator in accordance with the present invention.

According to the actuator 2 exercising the aforesaid functions and the robot 1 having the actuator 2, the drive command angular velocity $\omega_C$ of the motor (drive mechanism) 21 is set on the basis of the resultant desired angular velocity $\omega_0$ as the resultant angular velocity of the desired link angular velocity (the desired velocity of a load) $\omega_1$ and the desired driven angular velocity $\omega_2$ (refer to expression (3), FIG. 3, and S022 in FIG. 6). Then, based on the drive command angular velocity $\omega_C$, the motor angular velocity (the drive velocity of the drive mechanism) $\omega_M$ is controlled (refer to expression (6), FIG. 3, and S032 in FIG. 6). The component of the desired link angular velocity $\omega_1$ included in the resultant desired velocity $\omega_0$ allows stiffness to be imparted to the motion of the link 24. The stiffness of the motion here means a property which causes the link angular velocity $\omega_L$ to agree with the desired link angular velocity $\omega_1$ against an external force acting on the link 24. The link 24 is moved such that the stiffness of the motion causes a reaction force to be generated in response to the external force. Similarly, the component of the desired driven angular velocity $\omega_2$ included in the resultant desired velocity $\omega_0$ allows flexibility to be imparted to the motion of the link 24. The flexibility of the motion means a property which causes the link 24 to move in response to an external force acting on the link 24 according to the property or the properties (one or both of an elastic property and a damping property) of the flexible element 23. The flexibility of the motion causes the link 24 to move such that the motion follows the external force. This is because the desired driven angular velocity $\omega_2$ is set on the basis of the desired torque (the desired force) $\tau_0$ to be applied to the link 24, the damping coefficient $K_p$ and the elastic coefficient $r_s$ expressing the property of the flexible element 23, the link angular velocity $\omega_L$, the motor angle $\theta_M$, and the link angle $\theta_L$ (refer to expression (1)). Thus, the resultant ratio $K_f$ between the desired link angular velocity $\omega_1$ and the desired driven angular velocity $\omega_2$ is adjusted so as to adjust the balance between the stiffness and the flexibility of the motion of the link 24, making it possible to achieve proper compliance of the motion of the link 24 according to an environment or application in which the actuator 2 is operated.

Figure 7:
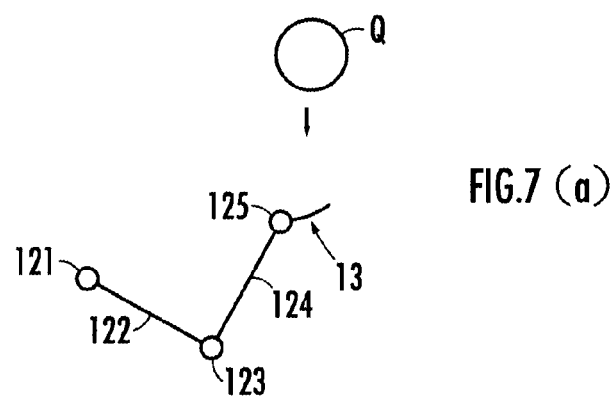
FIG. 7($a$) to FIG. 7($d$) are schematic diagrams illustrating a motion of the robot in accordance with the present invention.
Figure 7:
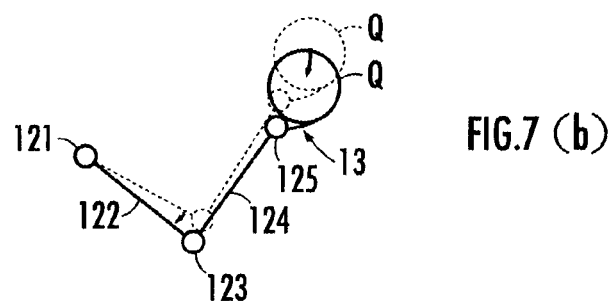
Figure 7:
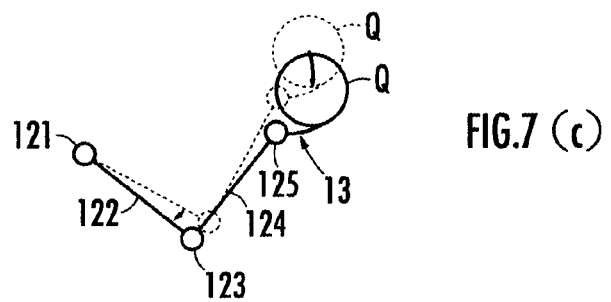
Figure 7:
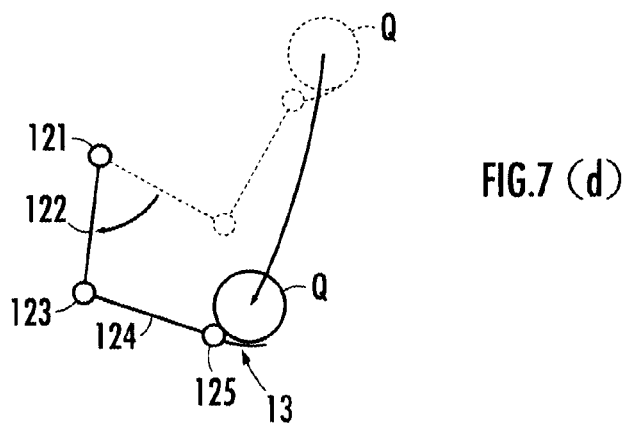

For example, when the robot 1 receives a falling object Q with the hand 13, the motion of the arm 12 is controlled as illustrated in (a) to (d) of FIG. 7 in this order. More specifically, the motions of the first arm link 122, the second arm link 124, and the hand 13 connected to the joints 121, 123, and 125 are controlled to securely support the object Q from under by the stiffness of the motion of the arm 12 and to receive the object Q by the flexibility of the motion of the arm 12. Even if the object Q is a breakable object, such as an egg, the robot 1 is capable of securely receive the egg by its hand 13 without breaking the egg by the flexible motion of the arm 12.

Furthermore, even if the rigidity of the link 24 is reduced, the compliance of the motion of the link 24 in response to an external force is secured, thus permitting a reduced weight of the link 24 to be achieved. Achieving compactness of the link 24 by reducing the weight thereof makes it possible to secure, for example, the space for installing the motor 21 and sensors and also the space for routing the wires connected to the motor 21 and the signal conductors connected to the sensors. This enables the robot 1 to have multiple functions.

Further, the torque generated by a virtual elastic element on the basis of the difference between the desired link angle $\theta_{L0}$ and the link angle $\theta_L$ ($r_{vs}\cdot(\theta_{L0}-\theta_L)$) is calculated and the desired torque $\tau_0$ is amended by adding the calculated torque (refer to expression (2)). Thus, the desired torque $\tau_0$ can be properly amended on the basis of the difference between the link angle $\theta_L$ and the desired link angle $\theta_{L0}$.

As another embodiment of the present invention, the second processor 220 may set the permissible range of the motor angular velocity $\omega_M$ [($\omega_{M-}$, $\omega_{M+}$] according to an expression indicative of the properties of the flexible element 23 on the basis of the permissible range of the torque [$\tau_-$, $\tau_+$] of the actuator 2 defined beforehand by the specifications thereof, the motor angle $\omega_M$, the link angle $\theta_L$, and the link angular velocity $\omega_L$. Then, the drive command velocity $\omega_C$ may be set by directly using the resultant desired velocity $\omega_0$ as the drive command velocity $\omega_C$ if the resultant desired velocity $\omega_0$ falls within the permissible range. If the resultant desired velocity $\omega_0$ does not fall within the permissible range, then the resultant desired velocity $\omega_0$ is amended such that the resultant desired velocity $\omega_0$ falls within the permissible range, thereby setting the drive command velocity $\omega_C$.

Figure 8:
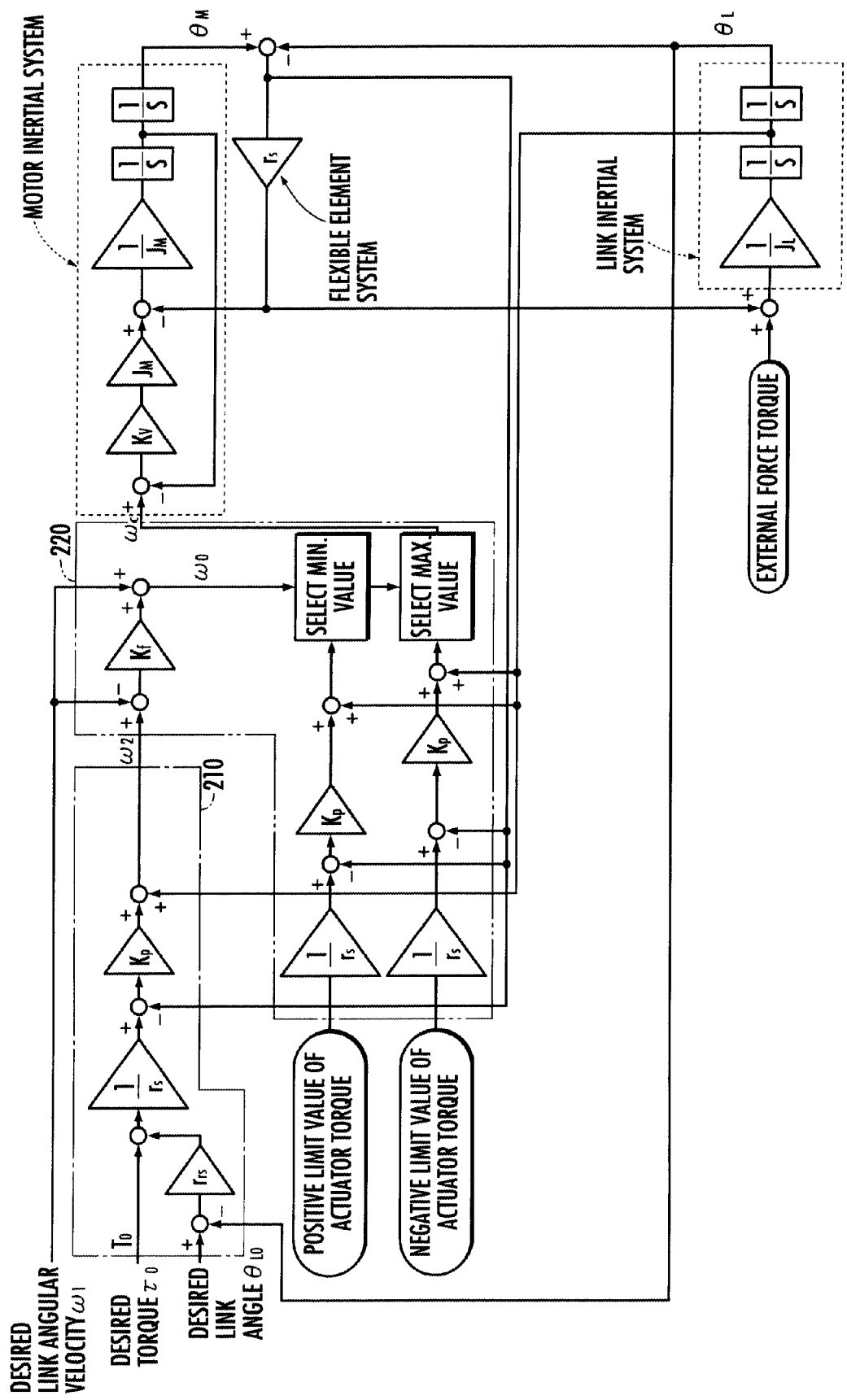
FIG. 8 is another explanatory diagram illustrating the construction of the controller of the actuator in accordance with the present invention.

More specifically, the construction of the second processor 220 illustrated in FIG. 4 may be modified as illustrated in FIG. 8. This construction sets the drive command angular velocity $\omega_C$ as described below. A positive limit value $\tau_+$ of the actuator torque $\tau$ is read from a memory and recognized (S121 in FIG. 9), and based on the recognized positive limit value $\tau_+$, the positive limit value $\omega_{M+}$ of the motor angular velocity $\omega_M$ shown in expression (7) is calculated (S123 in FIG. 9).

$$\tau_{M+} = (r_s/K_p)\cdot(\omega_{M+}-\omega_L) + r_s\cdot(\theta_M-\theta_L) \quad (7)$$

Figure 9:
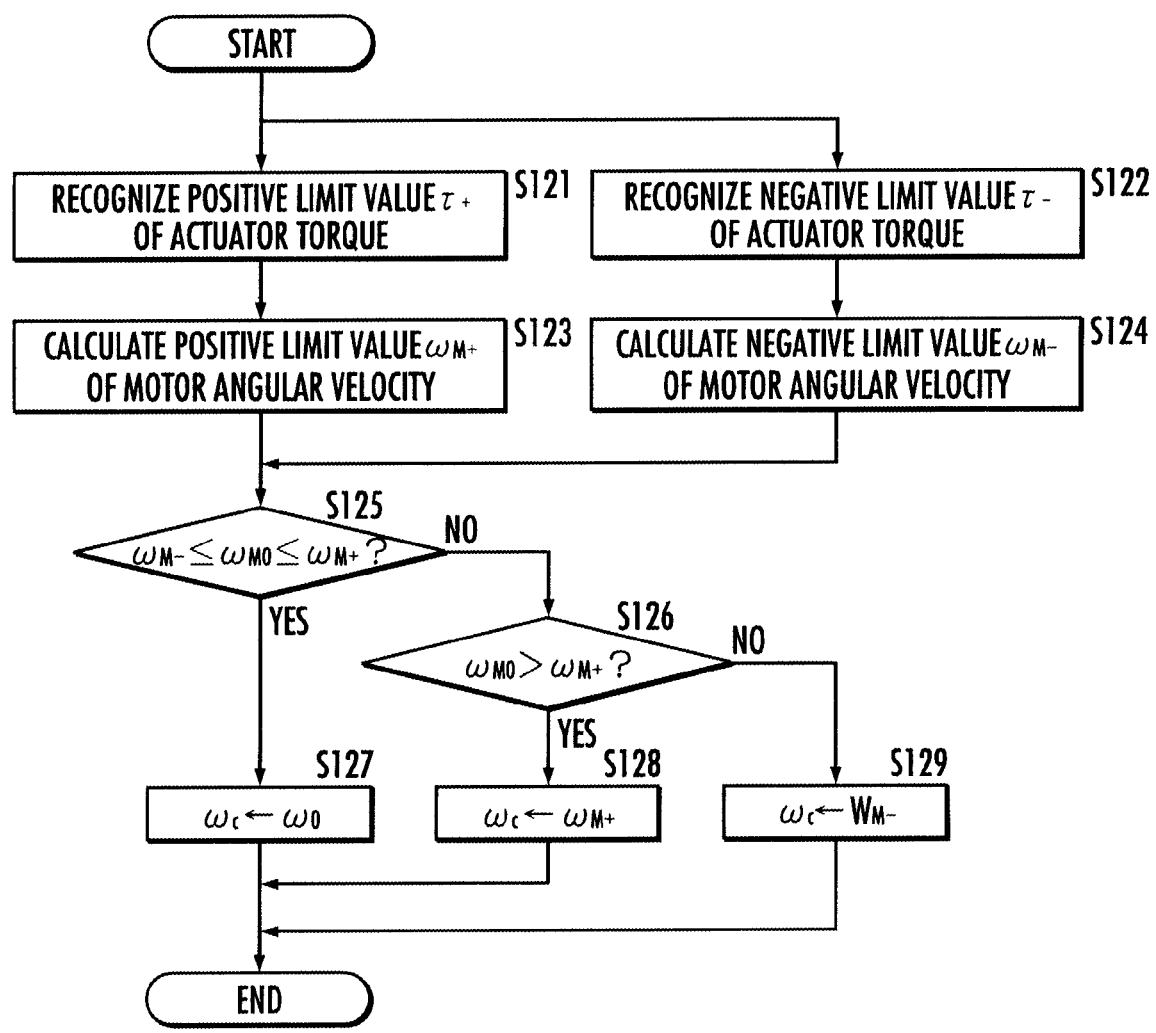
FIG. 9 is a flowchart of setting a desired torque of a motor.

Further, the negative limit value $\tau_-$ of the actuator torque $\tau$ is read from the memory and recognized (S122 in FIG. 9), and based on the recognized negative limit value $\tau_-$, the negative limit value $\omega_{M-}$ of the motor angular velocity $\omega_M$ shown in expression (8) is calculated (S124 in FIG. 9).

$$\tau_{M-}=(r_s/K_p)\cdot(\omega_{M-}-\omega_L)+r_s\cdot(\theta_M-\theta_L) \qquad (8)$$

Thus, the permissible range of the motor angular velocity $\omega_M$ [$\omega_{M-}$, $\omega_{M+}$] defined by the positive limit value $\omega_{M+}$ and the negative limit value $\omega_{M-}$ is set.

Then, it is determined whether the resultant desired angular velocity $\omega_0$ calculated as the resultant desired angular velocity of the desired link angular velocity $\omega_1$ and the desired driven angular velocity $\omega_2$ as described above falls within the permissible range [($\omega_{M-}$, $\omega_{M+}$] (S125 in FIG. 9). If the determination result is affirmative (YES in S125 in FIG. 9), then the resultant desired angular velocity $\omega_0$ is directly set as the drive command angular velocity $\omega_C$ (S127 in FIG. 9). Meanwhile, if the determination result is negative (NO in S125 in FIG. 9), then it is further determined whether the resultant desired angular velocity $\omega_0$ exceeds the positive limit value $\omega M+$(S126 in FIG. 9). If the determination result is affirmative (YES in S126 in FIG. 9), then the positive limit value $\omega_{M+}$ is set as the drive command angular velocity $\omega_C$ (S128 in FIG. 9). If the determination result is negative (NO in S126 in FIG. 9), then the negative limit value $\omega_{M-}$ is set as the drive command angular velocity $\omega_C$ (S129 in FIG. 9).

According to the robot 1 in another embodiment described above, the drive command velocity $\omega_c$ is set such that the motor angular velocity $\omega_M$ does not deviate from the permissible range, thus preventing an undue burden from being applied to the motor 21 and the force transmitting system, which includes the speed reducer 22 and the flexible element 23 and which transmits forces from the motor 21 to the link 24. This makes it possible to protect, for example, a gear of the speed reducer 22 from undue wear or damage and also protects the flexible element 23 from damage or the like.

In the aforesaid embodiments, the actuator 2 has been used to control the motion of the link 24 of the robot 1; however, as another embodiment, the actuator 2 may be used to control the motions of all loads, such as the opening/closing of a door of an automobile, the raising/reclining motion of the back of an automobile seat, and the motion of a seatbelt to maintain safe position and posture of a passenger of the automobile with respect to a seat, except for the link 24 of the robot 1. In place of the rotating drive mechanism, such as the motor 21, a drive mechanism, such as a piston-cylinder type linear motion drive mechanism, may be used. If the rotational motion of the output shaft of the motor 21 need to be converted into a linear motion or the like rather than the rotational motion of a load, then a force transmitting mechanism for converting a rotational motion into a linear motion may be used.

Further, the robot 1 or the actuator 2 may be equipped with a resultant ratio setting element which recognizes an action scheme of each of the links 24, that is, an action scheme of the robot 1, and sets the resultant ratio $K_f$ of the desired link angular velocity $\omega_1$ and the desired driven angular velocity $\omega_2$ by the second processor 220 on the basis of the result of the recognition. According to this embodiment, the resultant ratio $K_f$ of the desired link angular velocity $\omega_1$ and the desired driven angular velocity $\omega_2$ is adjusted (refer to expression (3)) according to the action scheme of each of the link 24 or the robot 1. This makes it possible to properly adjust the balance between the stiffness and the flexibility of the motion of each of the links 24 when causing the robot 1 or each of the links 24 to behave according to the action scheme.

What is claimed is:

1. An actuator, comprising:
a drive mechanism;
a flexible element interposed between the drive mechanism and a load; and
a controller which controls a force to be applied to the load through an intermediary of the flexible element by controlling motion of the drive mechanism,
wherein the controller comprises a first processing element and a second processing element,
the first processing element sets a desired driven velocity of the drive mechanism on the basis of a desired force to be applied to the load, an actual velocity of the load, actual positions of the drive mechanism and the load, and a flexibility coefficient indicative of a property of the flexible element,
the second processing element sets a drive command velocity on the basis of a resultant desired velocity, which is a resultant velocity of a desired load velocity, which is the desired velocity of the load, and the desired driven velocity set by the first processing element, and
the controller controls the drive velocity of the drive mechanism on the basis of the drive command velocity set by the second processing element.

2. The actuator according to claim 1, wherein
the second processing element sets a permissible range of the drive velocity of the drive mechanism on the basis of the permissible range of a force of the actuator determined beforehand by specifications, the actual positions of the drive mechanism and the load, the actual velocity of the load, and the flexibility coefficient, and then sets the resultant desired velocity directly as the drive command velocity in the case where the resultant desired velocity falls within the permissible range, while the second processing element sets the drive command velocity by amending the resultant desired velocity such that the resultant desired velocity falls within the permissible range in the case where the resultant desired velocity does not fall within the permissible range.

3. The actuator according to claim 1, wherein
the first processing element calculates a force produced by a virtual elastic element on the basis of the difference between a desired position of the load and the actual position of the load, adds the calculated force to the desired force to be applied to the load so as to amend the desired force, and then sets the desired driven velocity by using the amended desired force.

4. The actuator according to claim 1, comprising:
a resultant ratio setting element which recognizes an action scheme for the load and sets a resultant ratio between the desired load velocity and the desired driven velocity by the second processing element on the basis of a result of the recognition.

5. A robot, comprising:
an actuator; and
a link driven by the actuator,
wherein the actuator comprises a drive mechanism, a flexible element interposed between the drive mechanism and the link as a load, and a controller which controls a force to be applied to the load through an intermediary of the flexible element by controlling motion of the drive mechanism,
the controller comprises a first processing element and a second processing element,
the first processing element sets a desired driven velocity of the drive mechanism on the basis of a desired force to be applied to the load, an actual velocity of the load, actual positions of the drive mechanism and the load, and a flexibility coefficient indicative of a property of the flexible element, the second processing element sets a drive command velocity on the basis of a resultant desired velocity, which is a resultant velocity of a desired load velocity, which is the desired velocity of the load, and the desired driven velocity set by the first processing element, and the controller controls the drive velocity of the drive mechanism on the basis of the drive command velocity set by the second processing element.

6. The robot according to claim 5, comprising:

a resultant ratio setting element which recognizes an action scheme of the robot and sets a resultant ratio between the desired load velocity and the desired driven velocity by the second processing element on the basis of a result of the recognition.

* * * * *